United States Patent [19]
Bond et al.

[11] Patent Number: 5,495,496
[45] Date of Patent: Feb. 27, 1996

[54] METHOD AND APPARATUS FOR SUPPRESSING LINEAR AMPLITUDE INTERFERENCE FROM BANDSPREAD COMMUNICATION SIGNALS

[75] Inventors: James W. Bond, San Diego, Calif.; Williams Velez, Tuscon, Ariz.

[73] Assignee: The United States of America as represented by the Secretary of the Navy, Washington, D.C.

[21] Appl. No.: 766,605

[22] Filed: Sep. 26, 1991

[51] Int. Cl.$^6$ .................................................... H04B 1/69
[52] U.S. Cl. ............................................ 375/200; 375/208
[58] Field of Search .................................. 375/1, 200, 208; 380/34

[56] References Cited

U.S. PATENT DOCUMENTS

| | | | |
|---|---|---|---|
| 4,314,371 | 2/1982 | Covington et al. | |
| 4,481,640 | 11/1984 | Chow et al. | 375/1 |
| 4,621,365 | 11/1986 | Chiu | 375/1 |
| 4,727,504 | 2/1988 | Van Broekhoven. | |
| 4,736,455 | 4/1988 | Matsue et al. | |
| 4,823,361 | 4/1989 | Yosida. | |
| 4,835,723 | 5/1989 | Hansen. | |
| 4,894,842 | 1/1990 | Broekhoven et al. | 375/1 |
| 4,922,506 | 5/1990 | McCallister et al. | 375/1 |

*Primary Examiner*—Salvatore Cangialosi
*Attorney, Agent, or Firm*—Harvey Fendelman; Thomas Glenn Keough

[57] ABSTRACT

A method and apparatus are provided for suppressing linear amplitude interference (e.g., on-off interference) from a sequence of bandspread communication signals generated by a radio receiver. Each sample is defined as a vector having signal and interference vector components. The interference vector component is such that the amplitude of the interference: 1) is essentially linear, and 2) dominates the signal component. To suppress the linear amplitude interference, a pseudo second derivative is obtained for each sample based upon the current, previous and subsequent sample amplitudes. The pseudo second derivative for each current sample is transformed into a corresponding pseudo second derivative vector based on a symmetric sampling of pseudo second derivatives from previous and subsequent received signal samples. All terms of each corresponding pseudo second derivative vector are summed and averaged to generate a corresponding average enhanced signal gain for each sample. Each corresponding average enhanced signal gain is multiplied by a normalized vector approximately parallel to the corresponding sample's interference vector component. This estimates the signal vector component that is parallel to the interference vector component for each sample as an indication of the desired communication signal. The method and apparatus are effective whenever the amplitude of the interference vector components is approximately linear over the time that the interference is present.

12 Claims, 4 Drawing Sheets

METHOD AND APPARATUS FOR SUPPRESSING LINEAR AMPLITUDE INTERFERENCE FROM BANDSPREAD COMMUNICATION SIGNALS

STATEMENT OF GOVERNMENT INTEREST

The invention described herein may be manufactured and used by or for the Government of the United States for governmental purposes without the payment of any royalties thereon or therefor.

FIELD OF THE INVENTION

The present invention relates to the field of radio frequency interference suppression and more particularly to a method and apparatus for suppressing linear amplitude interference from bandspread communication signals.

BACKGROUND OF THE INVENTION

Since narrow frequency band communication signals are easily detected, jammed, etc., military communication systems utilize bandspread communication signals. However, in a military theater of operation, unfriendly forces intentionally interject non-Gaussian interference into the radio transmission spectrum which can interfere with the reception of even bandspread signals. Additionally, such "intentional" interference generally dominates the transmission signal as well as any Gaussian noise associated therewith.

One type of such interference is known as "on-off" interference. On-off interference is generally caused by two narrow band interferers radiating from separate interference sources. The interference pattern from the two sources interfere with one another such that they add together when in phase and cancel each other when out of phase. The resulting interference appears as a pulsed interference whereby the amplitude of any given pulse is approximately linear over the length of the pulse.

Prior art on-off interference suppression systems have typically applied adaptive filtering techniques to suppress interference from bandspread communication signals. One of the most effective techniques to date involves the use of nonlinear transformations of received signal samples. These transformations have traditionally been obtained by the estimation of the probability density function. The derivatives necessary to obtain the transformation from the probability density function have been calculated by using finite difference operations. However, this approach is computationally demanding and can only be implemented through the use of a dedicated microprocessor. In addition, this approach is only useful for digital radios operating in the lower portion of the radio frequency spectrum (i.e., LF, VLF or ELF) due to sampling rate considerations.

Thus, a need exists for a simple and effective method of suppressing on-off interference from bandspread communication signals. Accordingly, an object of the present invention is to provide a method and apparatus for suppressing on-off interference from bandspread communication signals whenever the interference dominates the signal being received. Another object of the present invention is to provide a method and apparatus for suppressing on-off interference from bandspread communication signals that is easily adapted to existing radio receivers. Still another object of the present invention is to provide a method and apparatus for suppressing any linear amplitude interference from bandspread communication signals.

SUMMARY OF THE INVENTION

A sequence of bandspread communication signal samples are generated by a radio receiver from the received communication signal. Each j-th sample is defined as a vector having a signal vector component and an interference vector component. The amplitude of the interference vector component is approximately linear and dominates the signal vector component. A method and apparatus are provided for suppressing the linear amplitude interference vector component and estimating a portion of the signal vector component that is parallel to the interference vector component as an indication of the bandspread communication signal. Each j-th sample is defined by an input pair $(x_j, y_j)$ and a corresponding amplitude for each j-th sample is determined. A pseudo second derivative for each j-th sample is approximated based on the amplitudes of the j-th, (j−1)th and (j+1)th samples whereby a sequence of pseudo second derivatives are generated. A pseudo second derivative vector for each j-th sample is then generated based on the sequence of pseudo second derivatives. Each j-th pseudo second derivative vector contains 2n terms centered symmetrically about each j-th sample's pseudo second derivative. The first n terms of each j-th pseudo second derivative vector are generated by successively subtracting the previous n sample's pseudo second derivatives from each j-th sample's pseudo second derivative. The second n terms of each j-th pseudo second derivative vector are generated by successively subtracting the subsequent n sample's pseudo second derivatives from each j-th sample's pseudo second derivative. The 2n terms for each j-th pseudo second derivative vector are then summed to generate an enhanced signal gain factor for each j-th sample. Each j-th enhanced signal gain factor is then averaged over the 2n terms and multiplied by a normalized vector approximately parallel to the corresponding interference vector to form a vector indicative of the communication signal. In this way, the signal component for each j-th sample is enhanced since the pseudo second derivative of the linear amplitude interference is zero.

DESCRIPTION OF THE DRAWINGS

FIG. 7 is a detail schematic diagram of the filter applier of FIG. 4; and

FIG. 8 is a detail schematic diagram of the unit energy combiner of FIG. 4.

DESCRIPTION OF THE PREFERRED EMBODIMENT

Figure 1:
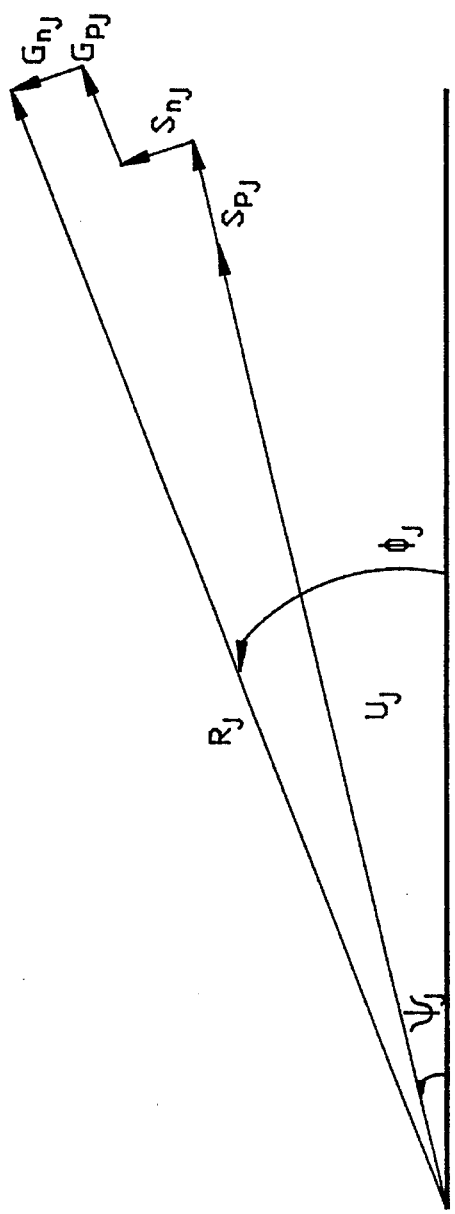
FIG. 1 is a vector diagram showing the relationships between the received signal and the interference, communication signal and noise signal components thereof.

Referring now to the drawings, and in particular to FIG. 1, a vector diagram will be used to explain the approach of the present invention. The baseband expression of a received (communication) signal vector $R_j$ (boldface type denotes a vector quantity) is assumed to have the following form:

$$R_j = U_j + S_j + G_j \tag{1}$$

where $U_j$ denotes the interference component vector, $S_j$ the communication signal component vector and $G_j$ the Gaussian noise component vector for each j-th received signal sample. $\phi_j$ is the phase of the received signal sample $R_j$ and $\psi_j$ is the phase of the interference component $U_j$. The difference between these two phase angles is exaggerated for purposes of illustration.

The components of $R_j$, $U_j$, $S_j$ and $G_j$ are pairs of real numbers where each pair consists of an inphase and quadrature component. Vectors $S_j$ and $G_j$ can be further decomposed into two pairs of vectors $S_{pj}$ and $G_{pj}$ parallel to $U_j$ and $S_{nj}$ and $G_{nj}$ normal to $U_j$. The lengths or amplitudes of $S_{pj}$ and $G_{pj}$ will be denoted $s_j$ and $g_j$, respectively, where a positive value indicates that the respective vector points away from the origin of $U_j$ and a negative value indicates that the respective vector points toward the origin of $U_j$. If the amplitude of the interference, denoted as $u_j$, can be canceled, the determination of the amplitude $s_j$ provides an indication of the desired communication signal.

It is further to be appreciated that the method and apparatus of the present invention are most needed when the interference component $U_j$ is much greater in magnitude than the maximum of either $S_j$ or $G_j$ (at least four times as great). Accordingly, the phase $\phi_j$ of the received signal sample $R_j$ is approximately equal to the phase $\psi_j$ of the interference vector component $U_j$. In addition, the method and apparatus of the present invention are used when the amplitude of the interference is linear or approximately so. For purposes of description, the present invention will hereinafter be disclosed with respect to pulsed or "on-off" interference where the amplitude of each "on" pulse is approximately linear. However, it is to be understood that the teachings of the present invention apply equally as well to linear amplitude interference that is on or present during the entire communication.

Figure 2:
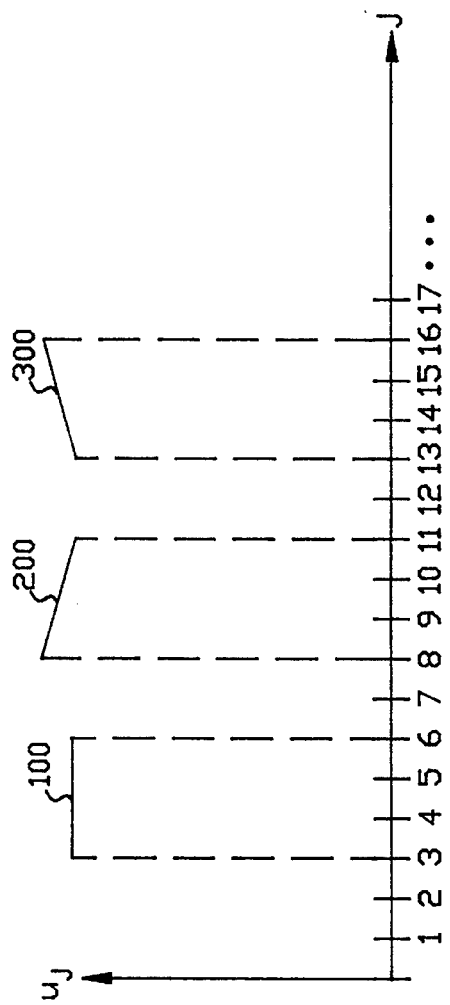
FIG. 2 depicts, in isolation, three sample interference pulses that may be effectively suppressed by the present invention.

Referring now to FIG. 2, three sample interference pulses having amplitudes $u_j$ are shown in isolation from the dominated communication and noise signals. It should be noted that not all on-off pulses can be canceled by the present invention. To be cancelable, the pulses must be on for at least three signal samples and off for at least two signal samples. Further, for the invention to be as effective as possible, the signal samples should be ½ chip apart. Accordingly, the choice of signal sampling rate must be adjusted based on the received signal pattern which may be indicative of the interference pattern.

During the time that the interference is on, the amplitude of the interference is essentially linear and, therefore, can be considered to behave according to the well known equation y=mx+b. Further, the amplitude of the interference pulses could be approximately piecewise or, in other words, resemble a sawtooth wave. Thus, the amplitude $u_j$ can be constant over the pulse width as shown in pulse 100, decreasing linearly as shown in pulse 200 or increasing linearly as shown in pulse 300. Furthermore, during the time that the interference is on, the signal and noise amplitudes $s_j$ and $g_j$ respectively, are typically changing in a nonlinear fashion. Accordingly, if $A_j$ is the amplitude of the received signal sample $R_j$ and the second derivative of the $A_j$ is taken, the contribution from $u_j$ is small due to its essentially linear amplitude characteristic. However, the contribution from the signal and noise components $s_j$ and $g_j$, respectively, will have some value. Since the noise component $G_j$ is random in nature, the noise contribution tends to cancel out over time and is therefore not an obstacle to determining the signal amplitude $s_j$. With this in mind, if an averaged sum of (second derivative) amplitude differences is generated over time for each j-th sample, the signal amplitude $s_j$ will be enhanced while the interference amplitude $u_j$ will be suppressed.

In order to circumvent the tedious second derivative calculation, the present invention approximates the second derivative based on the received signal amplitude $A_j$. In particular, the method approximates the second derivative of the received signal amplitude $A_j$ by forming a simple sum based on the j-th sample and samples prior to and subsequent to the j-th sample. Specifically, it has been shown that the second derivative is approximately proportional to the sum $$2A_j - A_{j-1} - A_{j+1} \tag{2}$$

which will hereinafter be denoted as $DA_j$ and referred to simply as the pseudo second derivative. It may be readily shown that the sum in equation (2) is proportional to an approximation of the second derivative when the samples are equally spaced. This follows from the fact that the first derivative is approximately equal to the difference in amplitude between two samples divided by the time between the two samples or $$f'(A) \approx \frac{\Delta A}{\Delta t} \tag{3}$$

The actual second derivative is therefore approximately equal to a difference of amplitude differences divided by the square of the change in time or $$f''(A) \approx \frac{\Delta(\Delta A)}{\Delta t^2} \tag{4}$$

For the j-th sample, $\Delta(\Delta A)_j$ is the sum $$\Delta A_{j+1} - \Delta A_j = (A_{j+1} - A_j) - (A_j - A_{j-1}) \tag{5}$$

which implies that the sum in equation (2) is proportional to the magnitude of $$(\Delta t)^2 (f''(A_j)) \tag{6}$$

thereby permitting simplification of the interference filter design.

The aforementioned averaged sum of amplitude differences is ideally the sum of pseudo second derivative differences generated by taking a symmetric sampling about the pseudo second derivative of the j-th sample and then averaging the sum over the size of the symmetric sampling. This can be expressed mathematically as $$\frac{1}{2n} \sum_{i=j-n}^{j+n} (DA_j - DA_i) \tag{7}$$

where n is number of samples prior and subsequent to the j-th sample. The value of n is chosen to be an integer power of 2 in order to simplify the summing network used. Note that the summation term for each j-th sample is averaged over the symmetric sampling. Depending on the radio receiver, its frequency of operation, and the nature of the interference, allowable values of n starting with 3 may be experimented with until satisfactory signal reception is achieved.

By applying equation (7), the contribution of the interference to the j-th sample is zero whenever the linear amplitude interference pulses on (or is continually on) between the j-n sample time and the j+n sample time. Since equation (7) can also be written as $$DA_j - \frac{\sum_{i=j-n, i \neq j}^{j+n} DA_i}{2n} \qquad (8)$$

it is readily apparent that the signal and noise terms for the j-th sample will be enhanced relative to the signal and noise terms for any other sample in the sum. To convert the sum of equation (7) (i.e., a magnitude) into a vector that approximates the vector $S_{pj}$, the magnitude resulting from equation (7) is multiplied by a normalized vector represented by the coordinate pair $(x_j/A_j, y_j/A_j)$. This normalized vector is approximately parallel to the interference component $U_j$ because the phase $\phi_j$ of the received signal $R_j$ is approximately equal to the phase $\psi_j$ of the interference component $U_j$.

The above described method is effective for suppressing signal dominating, linear amplitude interference (as encountered with on-off interference) from bandspread signals having information bits spread by a factor of at least 10 chips. Note that even this modest amount of bandspreading provides sufficient processing gain to extract the amplitude $s_j$ from the received signal amplitude $A_j$.

Figure 3:
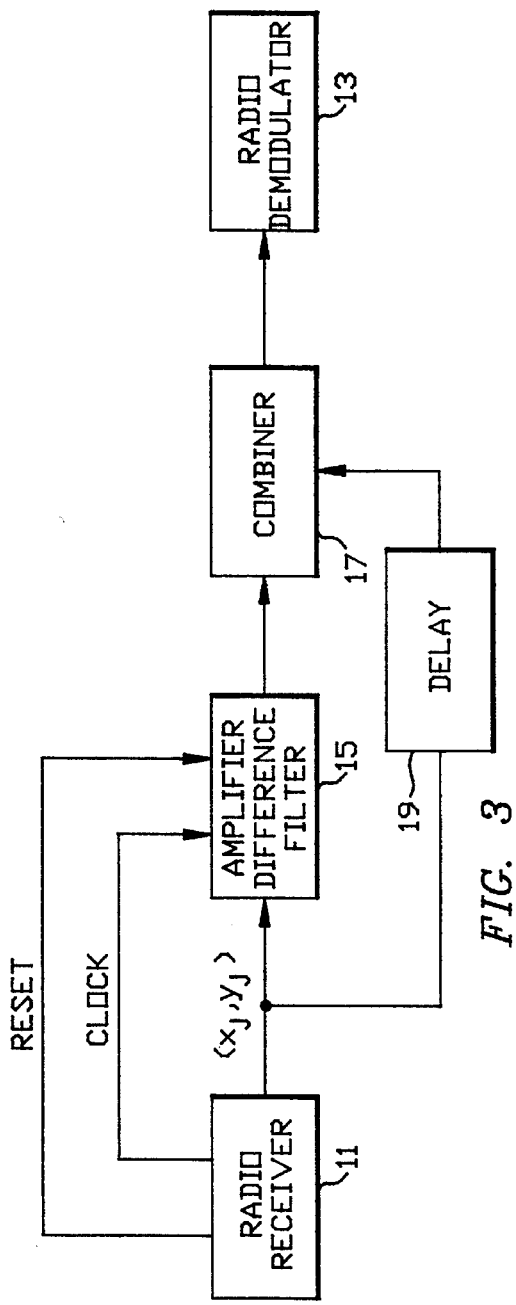
FIG. 3 is a block diagram of the basic hardware elements of the present invention as they would be installed in a radio receiver.

The apparatus for implementing the above described method will now be explained with reference to FIGS. 3 through 7. In FIG. 3, a typical military radio is shown for purposes of description to consist essentially of a radio receiver 11 and radio demodulator 13. An amplitude difference filter 15 and unit energy combiner 17 are connected between receiver 11 and demodulator 13 to implement the method of the present invention. A second input to combiner 17, provided from the output of receiver 11, is appropriately delayed by a delay 19 for reasons to be explained further hereinbelow. Finally, Reset and Clock signals from receiver 11 are input to amplitude difference filter 15 in order to synchronize same with receiver 11 and demodulator 13.

Figure 4:
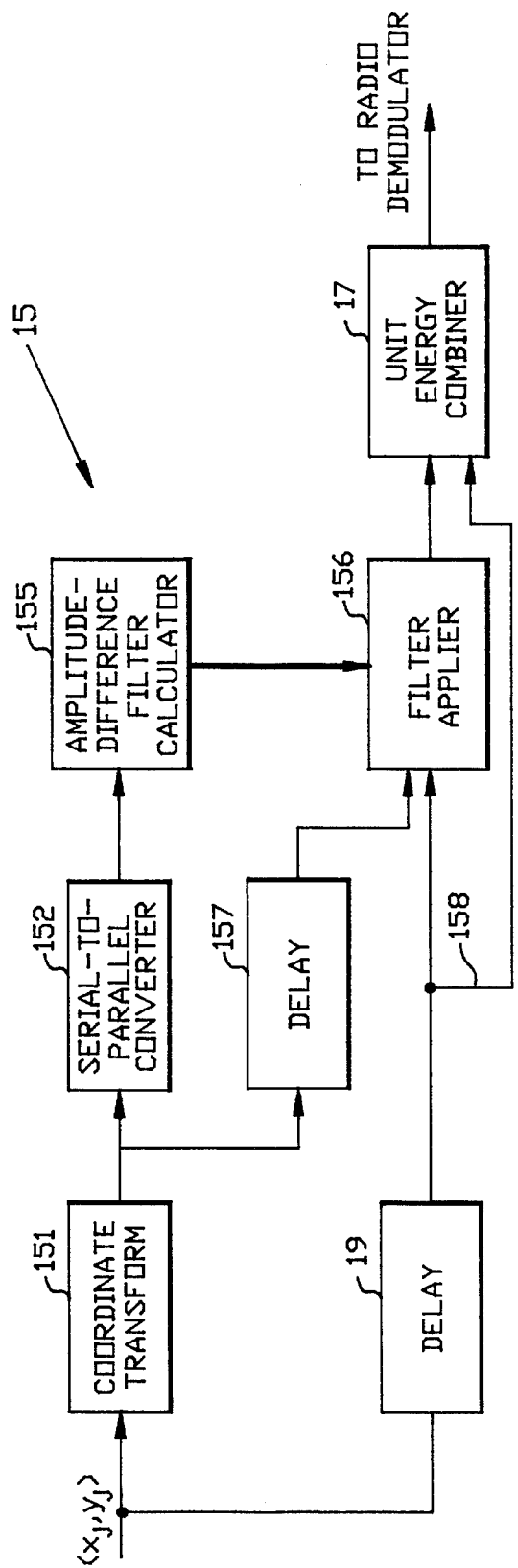
FIG. 4 is a detail block diagram showing the major components of the amplitude difference filter of FIG. 3.

In FIG. 4, a block diagram shows the major components of amplitude difference filter 15. Recalling that $R_j$ is defined by an inphase/quadrature input pair $(x_j, y_j)$, $A_j$ is defined as $$A_j = \sqrt{x_j^2 + y_j^2} \qquad (9)$$

Figure 5:
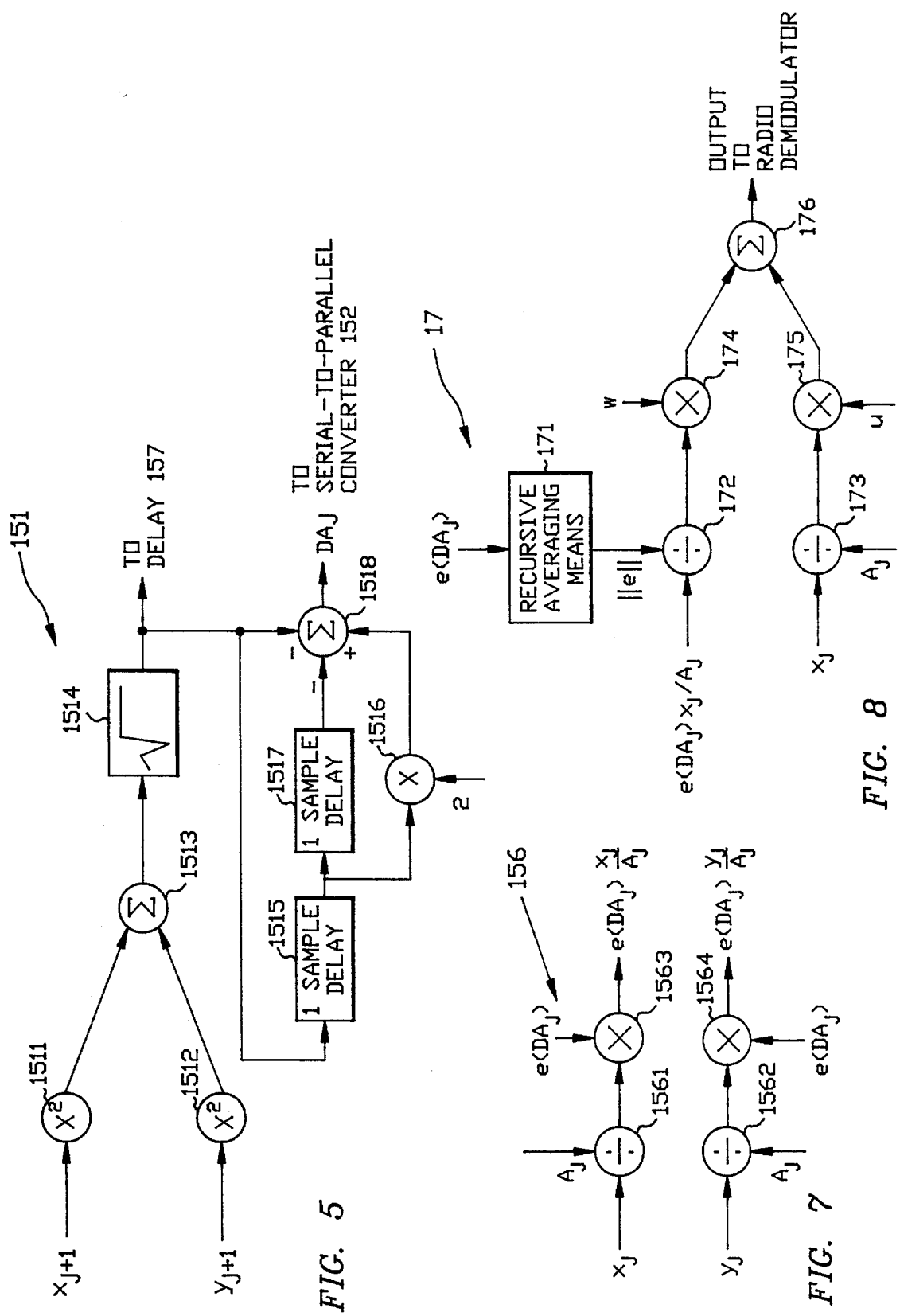
FIG. 5 is a detail block diagram of the coordinate transform of FIG. 4.

A coordinate transform 151, shown in greater detail in FIG. 5, is therefore provided to: 1) calculate the amplitude $A_j$ for each j-th sample input pair, and 2) obtain the pseudo second derivative $DA_j$ for each input pair. Since the pseudo second derivative $DA_j$ requires the (j+1) sample amplitude, the determination of $DA_j$ must be delayed until the receipt of the (j+1) input pair. At this point, each component of the input pair $(x_{j+1}, y_{j+1})$ is squared by multipliers 1511 and 1512, respectively, and then summed by adder 1513. Means 1514 are provided to take the square root of the output of adder 1513 to generate the amplitude $A_{j+1}$. The amplitude $A_{j+1}$ is delayed by one sample at delay 1515. The output of delay 1515 (i.e., $A_j$) is multiplied by 2 at multiplier 1516 and is further delayed by delay 1517 whose output is $A_{j-1}$. An adder 1518 is provided to receive the signal indicative of $2A_j$, $A_{j-1}$ and $A_{j+1}$ to form the sum given in equation (2) which is $DA_j$.

A serial-to-parallel converter 152 is provided to convert each one of the sequence of pseudo second derivatives $DA_j$ into a vector of pseudo second derivative differences $$(DA_j-DA_{j-n}, \ldots, DA_j-DA_{j-1}, DA_j-DA_{j+1}, \ldots, DA_j-DA_{j+n})$$

where n is the aforementioned number of prior and subsequent samples used to form the vector. As is readily apparent, each j-th vector has 2n terms and is formed by subtracting n consecutive previous pseudo second derivatives and n consecutive subsequent pseudo second derivatives from the j-th pseudo second derivative.

Figure 6:
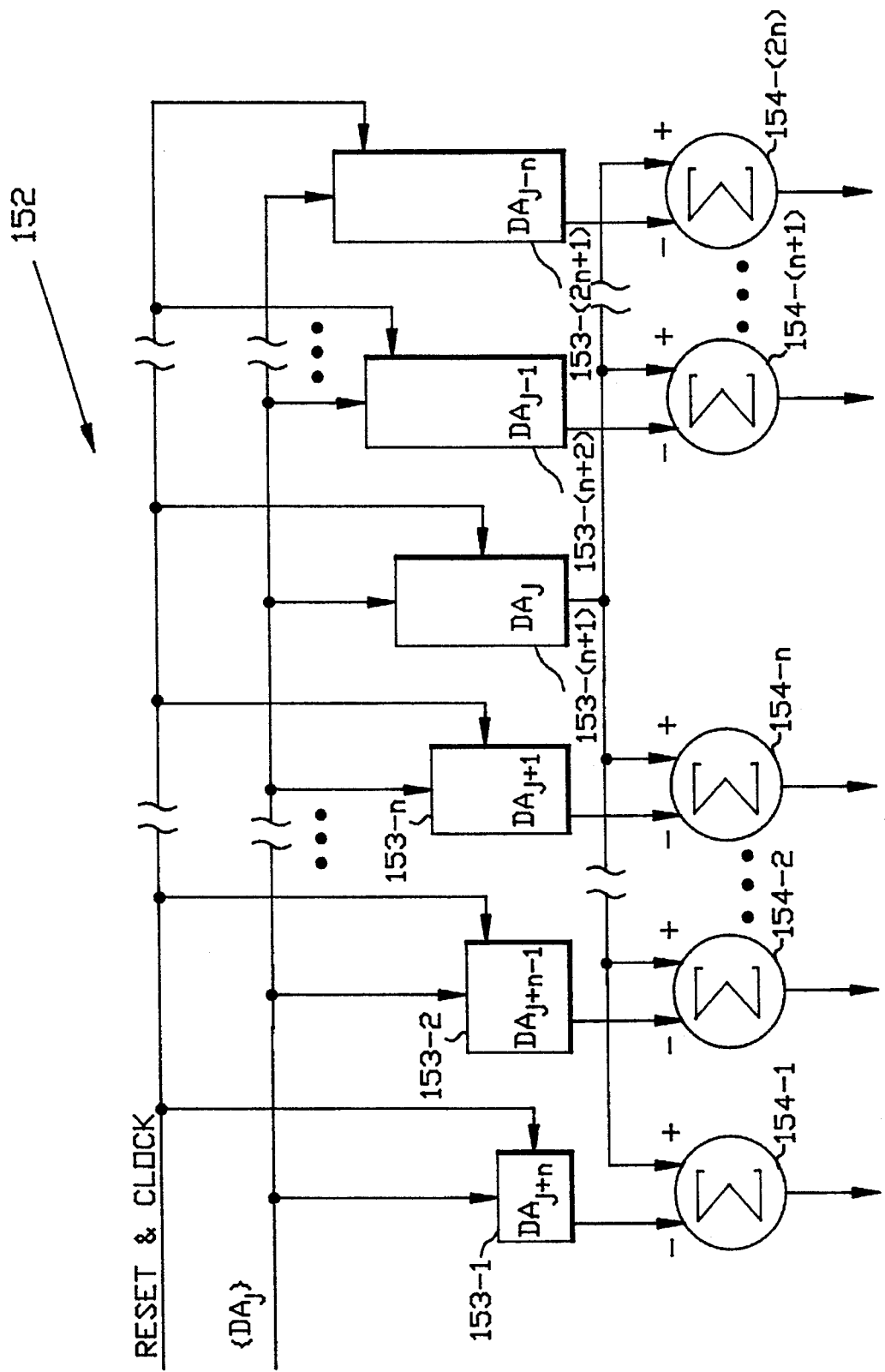
FIG. 6 is a detail schematic diagram of the serial-to-parallel converter of FIG. 4.

The structure of a preferred embodiment serial-to-parallel converter 152 will now be described in greater detail with reference to FIG. 6. In FIG. 6, a sequence of (2n+1) shift registers 153-1 through 153-(2n+1) have corresponding lengths of 1 to 2n+1. The Reset and Clock signals from radio receiver 11 are applied to each shift register for synchronization with receiver 11. The outputs of each shift register, except that of register 153-(n+1), are fed to a sequence of 2n adders 154-1 though 154-2n connected in parallel as shown, to generate the vector of pseudo second derivative differences.

Referring again to FIG. 4, an amplitude difference filter calculator 155 receives the outputs from serial-to-parallel converter 152 and uses any conventional summing network (not shown) to form the averaged sum term given by equation (3) for each j-th vector of pseudo second derivative differences. The choice of summing network is not a constraint on the present invention. As mentioned above, selecting n to be a power of 2 simplifies the design of the summing network. For example, if n=8, 16 outputs that would be generated by serial-to-parallel converter 152 would be fed to 8 adders. The 8 outputs generated thereby would serve as inputs to 4 adders. The 4 outputs generated by the 4 adders would serve as inputs to 2 adders and, finally, the outputs of the 2 adders would be summed by a single adder Thus, for the general case, if $n=2^m$, the summing network would consist of m+1 rows of adders where $2^m$ adders are used in the first row, $2^{m-1}$ adders are used in the second row, $2^{m-2}$ adders are used in the third row, . . . , and 1 adder is used in the (m+1)th row. For ease of description, the averaged sum term in equation (3) will hereinafter be referred to as an enhanced signal gain factor $e(DA_j)$.

A filter applier 156 receives the enhanced signal gain factor $e(DA_j)$ for each j-th sample, the amplitude $A_j$ appropriately delayed by delay 157, and the input pair $(x_j, y_j)$ appropriately delayed by delay 19. Delay 157 and delay 19 are chosen to synchronize $A_j$ and $(x_j, y_j)$ with $e(DA_j)$ according to the choice of n used in determining the averaged sum term of equation (3). Filter applier 156, shown in greater detail in FIG. 7, consists essentially of two dividers 1561, 1562 and two multipliers 1563, 1564. Divider 1561 divides $x_j$ by $A_j$ while divider 1562 divides $Y_j$ by $A_j$. Multiplier 1563 multiplies the enhanced signal gain factor $e(DA_j)$ from filter calculator 155 times $x_j/A_j$ while multiplier 1564 multiplies $e(DA_j)$ times $y_j/A_j$. Note that the output vector represented by the transformed pair $(e(DA_j)x_j/A_j, e(DA_j)y_j/A_j)$ is approximately parallel to the interference vector $U_j$.

The output of filter applier 156 is combined with the j-th input pair $(x_j, y_j)$ by unit energy combiner 17. The input pair $(x_j, y_j)$ is appropriately delayed by delay 19 to be in sync with the output of filter applier 156 and is fed to unit energy combiner 17 via a bleed-through path 158. (Note that bleed-through path 158 is also used to bypass the invention when there is no linear amplitude interference present.) Since the unit energy combiner 17 is prior art, its function will only be described with respect to the $x_j$ component. It is to be understood that similar processing occurs for the $Y_j$ component.

As shown in FIG. 8, the magnitudes of the enhanced signal gain factors are averaged over a plurality of signal samples (typically 15 or more samples) by conventional recursive averaging means 171 to form an average gain factor $\|e\|$. Thus, the average gain factor $\|e\|$ is continually updated and serves as the denominator for divider 172. The transformed input pair component $e(DA_j)x_j/A_j$ is used as the numerator for divider 172. The input pair component $x_j$ is ratioed with the sample magnitude $A_j$ at divider 173. The output of dividers 172 and 173 are then multiplied by weights w and u at multipliers 174 and 175, respectively. The weight adjusted components are then added at adder 176 and output to radio demodulator 13 which makes the signal usable to a listener. In this way, the best representation of the communication signal is achieved from either the filter path or bleed-through path.

The weights u and w are constants set by the user. They are selected so that the bleed-through path 158 provides sufficient gain for the cases in which a communications signal is equal to or stronger than present interfering signals. Optimal values can be found through experimentation. For example, in VLF applications, the values of u=1 and w=4 have provided good results.

The advantages of the present invention are numerous. The present invention is a non-adaptive interference suppression method, and apparatus for implementing same, which can be used to suppress linear amplitude interference (e.g., on-off interference) from bandspread communication signals. The present invention detects the transmitted communication signal in the presence of strong levels of non-Gaussian interference by exploiting the fact that the second derivative of such interference is close to zero. Thus, the present invention extracts the desired communication signal and need not estimate the amplitude of the interference as done by prior art adaptive filters. This results in a simpler filter design.

Although the invention has been described relative to a specific embodiment thereof, there are numerous variations and modifications that will be readily apparent to those skilled in the art in the light of the above teachings. It is therefore to be understood that, within the scope of the appended claims, the invention may be practiced other than as specifically described.

What is claimed as new and desired to be secured by Letters Patent of the United States is:

1. A method of suppressing linear amplitude interference from a sequence of bandspread communication signal samples in order to estimate a communication signal contained therein wherein information bits of the signal samples are spread by a factor of ten or more and wherein each j-th sample is defined by an input pair $(x_j, y_j)$ comprising the steps of:

generating a signal corresponding to the amplitude of each j-th sample;

using the signal corresponding to the amplitude to generate a signal approximating a quantity proportional to the second derivative for each j-th sample based on the amplitudes of the j-th, (j−1)th and (j+1)th samples to generate a sequence of pseudo second derivative signals;

generating a j-th pseudo second derivative vector signal for each j-th sample based on the sequence of pseudo second derivative signal, each j-th pseudo second derivative vector signal containing a representation of 2n terms centered symmetrically about each j-th sample's pseudo second derivative, wherein the first n terms represented in each j-th pseudo second derivative vector signal are generated by successively subtracting signals representing the previous n sample's pseudo second derivatives from each j-th sample's pseudo second derivative, and wherein the second n terms represented in each j-th pseudo second derivative vector signal are generated by successively subtracting signals representing the subsequent n sample's pseudo second derivatives from each j-th sample's pseudo second derivative;

generating a signal representing the sum of the 2n terms for each j-th pseudo second derivative vector to generate a j-th enhanced gain factor signal for each j-th sample; and generating a signal representing the average of each j-th enhanced signal gain factor over the 2n terms as an indication of the communication signal.

2. A method according to claim 1 wherein said step of generating a signal corresponding to the amplitude comprises the step of generating a signal corresponding to the amplitude of each j-th sample from its corresponding input pair $(x_j, y_j)$.

3. A method according to claim 1 wherein when the linear amplitude interference is pulsed on and off.

4. A method according to claim 1 wherein said step of generating a signal approximating a quantity comprises the step of generating a signal representing a sum equal to twice the j-th sample's amplitude less the (j−1)th and (j+1)th sample's amplitudes.

5. For a sequence of received bandspread communication signal samples such that each sample is defined as a vector having a signal vector component and an interference vector component, a method of estimating a portion of the signal vector component that is parallel to the interference vector component as an indication of the bandspread communication signal, comprising the steps of:

generating a signal corresponding to the amplitude of each sample's defined vector;

using the signal corresponding to the amplitude to generate a signal approximating a quantity proportional to the second derivative for each sample based on the amplitudes of current, previous and subsequent samples to generate a pseudo second derivative signal;

transforming the pseudo second derivative signal for each sample into a corresponding pseudo second derivative vector signal, each pseudo second derivative vector signal containing a representation of 2n terms centered symmetrically about each sample's pseudo second derivative, wherein the first n terms represented in each pseudo second derivative vector signal are generated by successively subtracting signals representing the previous n sample's pseudo second derivatives from each current sample's pseudo second derivative, and wherein the second n terms represented in each pseudo second derivative vector signal are generated by successively subtracting signals representing the subsequent n sample's pseudo second derivatives from each current sample's pseudo second derivative;

generating signals representing the sum of all terms of each corresponding pseudo second derivative vector;

generating a signal representing the average of the summed pseudo second derivative vector over 2n to generate a corresponding average enhanced gain signal for each sample; and generating a signal that represents the product of each corresponding average enhanced signal gain and a vector approximately parallel to the corresponding sample's interference vector component to estimate the signal vector component that is parallel to the interference vector component for each sample, wherein said method is applicable whenever the amplitude of the interference vector components is at least approximately linear.

6. For a radio receiving a sequence of bandspread communication signal samples whose information bits are spread by a factor of ten or more, wherein each j-th sample is defined by an input pair $(x_j, y_j)$ and an amplitude $A_j$, a method of estimating the communication signal when the signal samples contain linear amplitude interference comprising the steps of:

approximating a quantity $DA_j$ proportional to the second derivative of the amplitude $A_j$ by generating a first signal that represents the sum $$2A_j - A_{j-1} - A_{j+1};$$

using the first signal to generate a second signal representing an averaged sum $$\frac{\left( \sum_{i=j-n}^{j+n} DA_j - DA_i \right)}{2n}$$

where the value of n is based on the radio's frequency of operation; and using the second signal to generate each j-th sample's averaged sum and a vector defined by the coordinate pair $(x_j/A_j, y_j/A_j)$ wherein the resulting product is an estimate of the communication signal.

7. An apparatus for suppressing linear amplitude interference from a sequence of bandspread communication signal samples in order to estimate a communication signal contained therein, wherein the signal sample information bits are spread by a factor of ten or more and wherein each j-th sample is defined by an input pair $(x_j, y_j)$, said apparatus comprising:

first means for generating a signal corresponding to the amplitude of each j-th sample in the sequence;

second means operably coupled to said first means for approximating a quantity proportional to the second derivative for each j-th sample based on the amplitudes of the j-th, (j−1)th and (j+1)th samples to generate a sequence of pseudo second derivative signals;

third means operably coupled to said second means for generating a j-th pseudo second derivative vector signal for each j-th sample based on the sequence of pseudo second derivative signals, each j-th pseudo second derivative vector signal containing a representation of 2n terms centered symmetrically about each j-th sample's pseudo second derivative, wherein the first n terms represented in each j-th pseudo second derivative vector signal are generated by successively subtracting signals representing the previous n sample's pseudo second derivatives from each j-th sample's pseudo second derivative, and wherein the second n terms represented in each j-th pseudo second derivative vector signal are generated by successively subtracting signals representing the subsequent n sample's pseudo second derivatives from each j-th sample's pseudo second derivative; and fourth means operably coupled to said third means for generating a signal representing the sum of the 2n terms for each j-th pseudo second derivative vector to generate a j-th enhanced gain factor signal for each j-th sample in the sequence and for generating a signal representing the average of each j-th enhanced signal gain factor over the 2n terms as an indication of the communication signal.

8. An apparatus as in claim 7 wherein said second means comprises means for generating a signal representing a sum equal to twice the j-th sample's amplitude less the (j−1)th and (j+1)th sample's amplitudes.

9. An apparatus as in claim 7 wherein said third means is a serial-to-parallel converter comprising:

a sequence of (2n+1) shift registers having corresponding lengths of 1 to (2n+1) and connected in parallel for receiving each j-th pseudo second derivative signal; and a sequence of 2n adders connected in parallel, each one of a first sequence of n adders from said sequence of 2n adders further being serially connected to receive the output of a corresponding one of the first 1 to n shift registers from said sequence of (2n+1) shift registers, and each one of a second sequence of n adders from said sequence of 2n adders further being serially connected to receive the output of a corresponding one of the last n+2 to 2n shift registers from said sequence of (2n+1) shift registers, wherein said first and second sequence of n adders are non-overlapping sequences, and wherein each j-th pseudo second derivative signal passes unshifted through the (n+1) shift register to serve as a parallel input to each of said 2n adders.

10. In a filter for suppressing linear amplitude interference from a sequence of bandspread communication signal samples whose information bits are spread by a factor of ten or more, wherein each j-th sample is defined by an input pair $(x_j, y_j)$, said filter comprising:

a coordinate transform network for determining an amplitude $A_j$ and a quantity $DA_j$ proportional to the second derivative associated with each j-th sample from the sequence based on the input pair $(x_j, y_j)$, whereby a corresponding sequence of signals representing pseudo second derivatives are generated;

a serial-to-parallel converter coupled to said coordinate transform network for transforming each pseudo second derivative $D_j$ into a corresponding symmetric vector signal about j, each symmetric vector signal being a vector signal representing 2n pseudo second derivative differences $(DA_j - DA_{j-n}, \ldots, DA_j - DA_{j-1}, DA_j - DA_{j+1}, \ldots, DA_j - DA_{j+n})$, where n is a positive integer based on the filter's frequency of operation;

a summer operably coupled to said serial-to-parallel converter for generating a signal representing the sum of all terms of each vector of pseudo second derivative differences to form a corresponding sum signal for each j-th sample and for averaging each corresponding sum signal over the 2n pseudo second derivative differences to form a corresponding averaged sum signal; and a filter applier operably coupled to said summer for generating a signal representing the product of a vector represented by the coordinate pair $(x_j/A_j, y_j/A_j)$ and the corresponding averaged sum for each j-th sample.

11. A filter as in claim 10 wherein said coordinate transform network includes means for generating a signal representing the quantity $DA_j$ according to a sum $$2A_j - A_{j-1} - A_{j+1}.$$

12. A filter transform path as in claim 10 wherein said serial-to-parallel converter comprises:

a sequence of (2n+1) shift registers having corresponding lengths of 1 to (2n+1) and connected in parallel for receiving signals representing each pseudo second derivative $DA_j$; and a sequence of 2n adders connected in parallel, each one of a first sequence of n adders from said sequence of 2n adders further being serially connected to receive the output of a corresponding one of the first 1 to n shift registers from said sequence of (2n+1) shift registers, and each one of a second sequence of n adders from said sequence of 2n adders further being serially connected to receive the output of a corresponding one of the last n+2 to 2n shift registers from said sequence of (2n+1) shift registers, wherein said first and second sequence of n adders are non-overlapping sequences, and wherein each signal representing a pseudo second derivative $DA_j$ passes unshifted through the (n+1) shift register to serve as a parallel input to each of said 2n adders.

* * * * *